(12) United States Patent
Chee et al.

(10) Patent No.: US 7,312,949 B2
(45) Date of Patent: Dec. 25, 2007

(54) BASE DECK WITH OVERMOLDED ELASTOMERIC AND RIGID STRUCTURAL COMPONENTS

(75) Inventors: WaiOnn Chee, Singapore (SG); Niroot Jierapipatanakul, Singapore (SG); Quock Ying Ng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 429 days.

(21) Appl. No.: 10/691,324

(22) Filed: Oct. 22, 2003

(65) Prior Publication Data

US 2005/0088777 A1   Apr. 28, 2005

(51) Int. Cl.
 *G11B 33/02* (2006.01)
(52) U.S. Cl. .................................................. 360/97.01
(58) Field of Classification Search .............. 360/97.01
 See application file for complete search history.

(56) References Cited

U.S. PATENT DOCUMENTS

| | | | | |
|---|---|---|---|---|
| 4,202,091 A |   | 5/1980 | Ohnishi ...................... 29/527.1 |
| 4,826,598 A | * | 5/1989 | Cain ........................... 210/445 |
| 5,147,691 A |   | 9/1992 | Shimamoto ................. 427/387 |
| 5,149,048 A |   | 9/1992 | Morehouse ................. 248/632 |
| 5,164,542 A |   | 11/1992 | Hart ....................... 174/35 MS |
| 5,214,549 A |   | 5/1993 | Baker ....................... 360/97.02 |
| 5,235,482 A |   | 8/1993 | Schmitz .................... 360/97.02 |
| 5,282,100 A |   | 1/1994 | Tacklind ................... 360/97.02 |
| 5,426,562 A |   | 6/1995 | Morehouse ................. 361/685 |
| 5,469,311 A |   | 11/1995 | Nishida .................... 360/97.02 |
| 5,510,954 A |   | 4/1996 | Wyler ........................ 361/685 |
| 5,546,250 A |   | 8/1996 | Diel ......................... 360/97.02 |
| 5,552,209 A |   | 9/1996 | McCutcheon ............... 428/209 |
| 5,666,239 A |   | 9/1997 | Pottebaum ............... 360/97.03 |
| 5,898,989 A | * | 5/1999 | Strobl ........................... 29/597 |
| 5,932,949 A | * | 8/1999 | Ziegler et al. .............. 310/236 |
| 5,949,613 A |   | 9/1999 | Moir ........................ 360/99.08 |
| 6,023,392 A |   | 2/2000 | Kim ......................... 360/97.01 |
| 6,034,841 A |   | 3/2000 | Albrecht ................... 360/97.01 |
| 6,051,295 A | * | 4/2000 | Schloss et al. ............. 428/35.7 |
| 6,178,061 B1 |   | 1/2001 | Obara ...................... 360/97.01 |
| 6,269,537 B1 | * | 8/2001 | Kimura et al. ................ 29/832 |
| 6,426,847 B1 |   | 7/2002 | Dague ..................... 360/97.01 |

(Continued)

FOREIGN PATENT DOCUMENTS

JP          63-204580          8/1988

(Continued)

*Primary Examiner*—Jefferson Evans
(74) *Attorney, Agent, or Firm*—Fellers, Snider, et al.

(57) ABSTRACT

A base deck for a data storage device is preferably formed from a stamped, or fine blanked metallic platform portion, which supports an over-mold portion. The over-mold portion is a combination of elastomeric components and rigid structural components. In addition to providing structurally rigid side walls for the base deck, the over-mold portion also provides additional structurally rigid components, and features difficult to obtain from the platform portion formation process, such as a ramp load/unload feature and alignment guides. Elastomeric components provided by the over-mold process include gaskets for the top cover, motor, and actuator of the data storage device as well as impact dissipation members. The impact dissipation members aid in dissipating impact forces encountered by the data storage device during manufacturing of the data storage device as well as during the operational life of the data storage device.

18 Claims, 5 Drawing Sheets

U.S. PATENT DOCUMENTS

| | | |
|---|---|---|
| 6,449,119 B1 | 9/2002 | Hashizume .............. 360/97.03 |
| 6,572,588 B1 * | 6/2003 | Bierman et al. ............ 604/180 |
| 6,698,733 B1 * | 3/2004 | Larmande ................... 267/293 |
| 6,749,785 B2 * | 6/2004 | Subramanian et al. . 264/173.16 |
| 6,871,741 B2 * | 3/2005 | Bhatt et al. ................. 206/454 |
| 6,932,332 B2 * | 8/2005 | Thomazeau ............ 267/140.13 |
| 6,963,486 B2 * | 11/2005 | Kwitek ....................... 361/683 |
| 2003/0005533 A1 * | 1/2003 | Woodnorth et al. ........ 15/143.1 |
| 2003/0069612 A1 * | 4/2003 | Zart et al. ..................... 607/36 |
| 2004/0262782 A1 * | 12/2004 | Ellis et al. .................. 257/787 |

FOREIGN PATENT DOCUMENTS

| | | |
|---|---|---|
| JP | 2-139781 | 5/1990 |
| JP | 3-83281 | 4/1991 |
| JP | 5-232685 | 9/1993 |
| JP | 2000-195249 A * | 7/2000 |

* cited by examiner

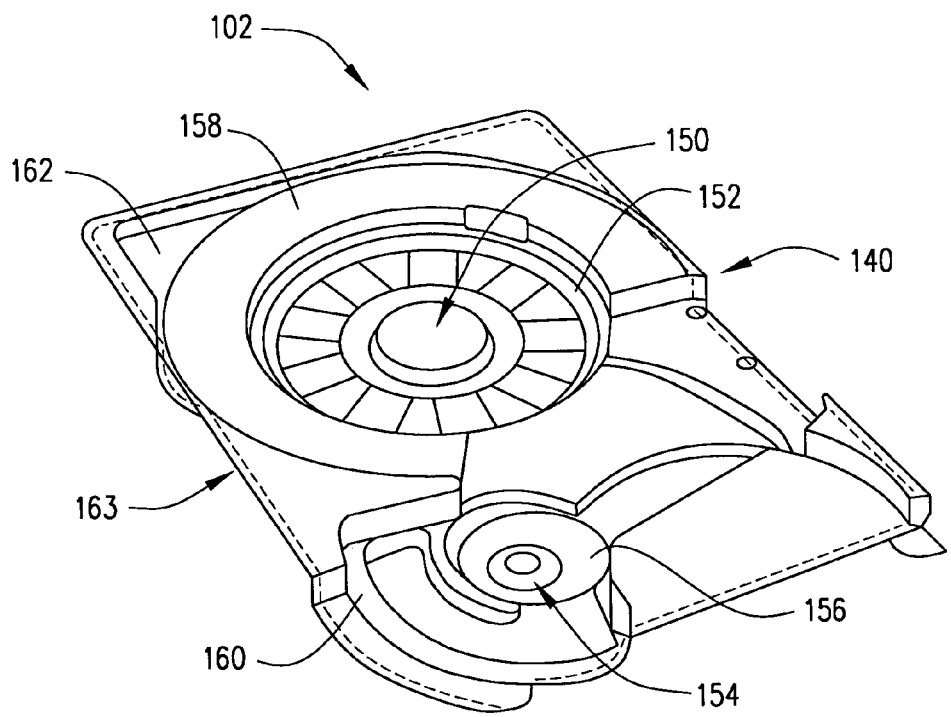
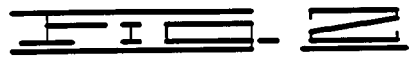
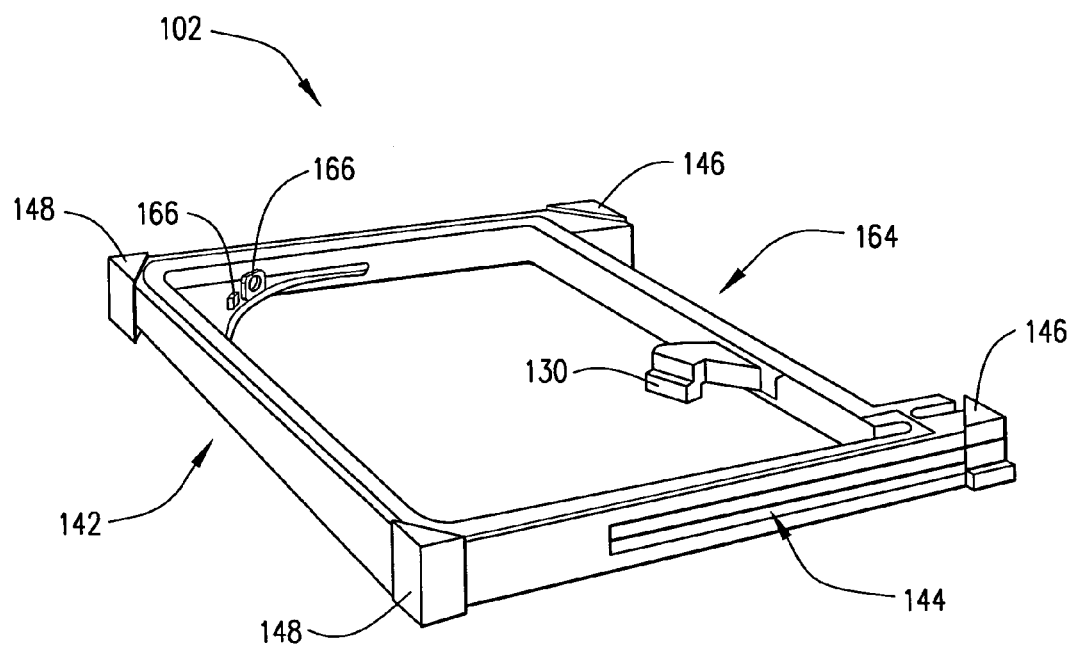
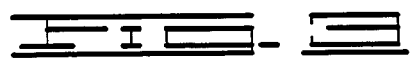

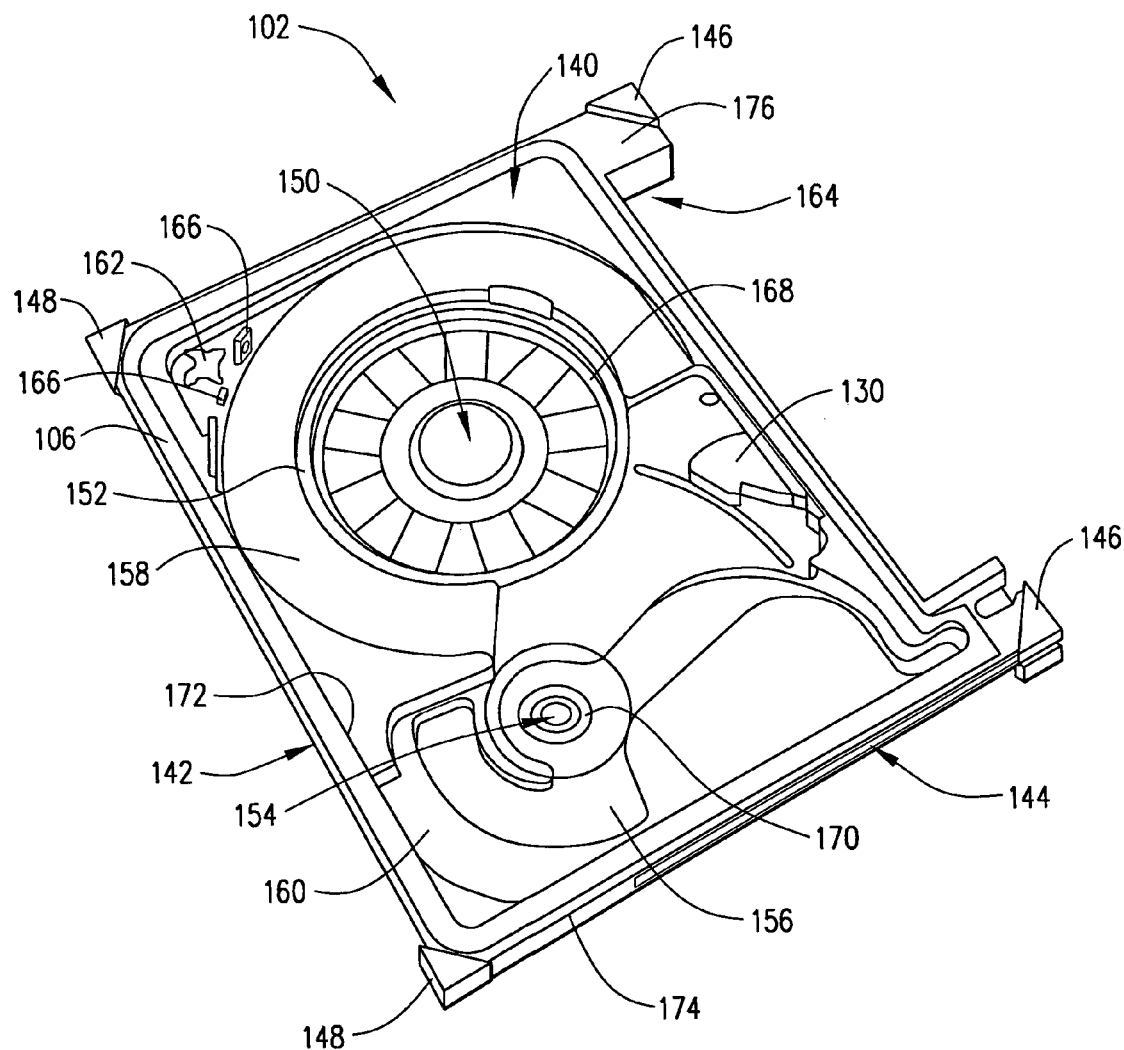
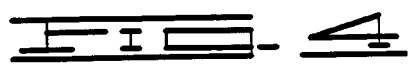

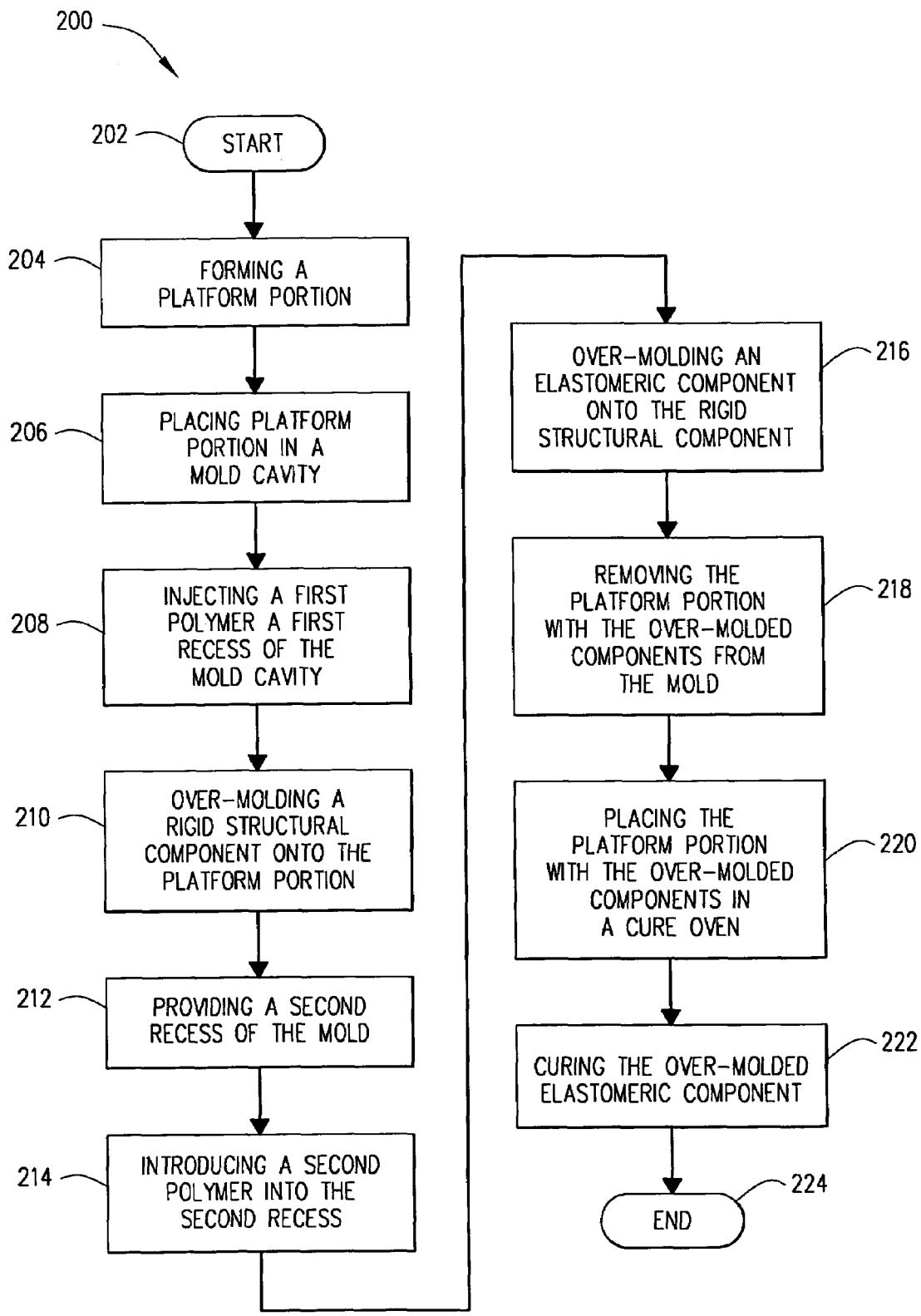

BASE DECK WITH OVERMOLDED ELASTOMERIC AND RIGID STRUCTURAL COMPONENTS

FIELD OF THE INVENTION

This application relates to data storage devices and more particularly to base decks having over-molded rigid structural and elastomeric components, and to a method for forming base decks having over-molded rigid structural and elastomeric components.

BACKGROUND

One key component of any computer system is a device, such as a data storage device (DSD), to store data. DSDs store digital data in magnetic form on a rotating storage disc. DSDs have an outer framework that includes a base deck and top cover. The base deck is essentially a platform to which DSD components are secured, and is of a size and shape to engage the computer. The top cover cooperates with the base deck to form an internal sealed compartment for housing other components of the DSD.

Typically, the base deck is composed of aluminum or steel, and is formed through either a metal die-casting or extrusion process. In either case, post-machining operations to reach required industry size tolerances are needed. For die-cast base decks, coatings, such as e-coat, are used to seal the porous die-cast metal. Finally, numerous pre-fabricated components of the DSD need to be carried in inventory and installed onto the base deck. These components include; but are not limited to, filter brackets, crash-stops, latching devices, mounting bosses, sound attenuation devices, ramp load/unload features, and shock protection features.

Forming a base deck by extrusion entails that the aluminum or steel substrate be extruded through a base deck shaped die. An extruded base deck, like the die-casting base deck, requires costly post machining operations, and also requires the installation of the plurality of pre-fabricated components. However, extruded base decks typically do not require a coating.

Regardless of the method for forming the base deck, both require that pre-fabricated DSD components be installed onto the machined base deck. The components are manufactured separately from each other and are assembled onto the base deck using various forms of fastening techniques. The process of installing the pre-fabricated components onto the base deck is costly and time consuming when each pre-fabricated component part, whether a feature or assembly and its associated fastening means, requires their own direct and indirect manufacturing cost attributed to the total cost of the DSD. In addition, when each pre-fabricated component incorporates tightly toleranced location features for locating the component to the base deck the cost increases. Finally, each individual pre-fabricated component is inspected, inventoried, tracked, and issued to the manufacturing floor for use in the base deck manufacturing process, further using up financial resources.

Accordingly, a need exists in the art to minimize the expense and time expended during the manufacturing process of conventional DSD base decks.

SUMMARY OF THE INVENTION

In accordance with preferred embodiments, a method, an apparatus and a combination are provided; for forming components of a data storage device (DSD), sealing an internal environment of the DSD, and inhibiting damage experienced by the DSD during the assembly process of the DSD.

The combination includes a spindle motor assembly supported by a base deck, the base deck formed by steps for over-molding a platform portion with a thermo-set plastic and an epoxidized elastomer.

In one embodiment, the method preferably includes stamping, or fine blanking the platform portion of the base deck, placing the formed platform portion in a mold cavity, injecting in a first polymer a first recess of the mold cavity, and over-molding a rigid structural component onto the platform portion. The method preferably continues with opening an elastomeric material gate to provide a second recess of the mold, introducing a second polymer into the second recess, and over-molding an elastomeric component onto the rigid structural component.

Preferentially, the method continues with removing the platform portion, which includes the over-molded rigid structural component and the over-molded elastomeric component, from the mold and placing it in a cure oven. The base deck is formed upon final curing of the over-molded elastomeric component, preferably at an elevated temperature in the range of 150° C. for a period of substantially 2 hours.

In another embodiment, the apparatus is preferably a base deck, which includes a platform portion supporting an over-mold portion. The over-mold portion is preferentially formed from elastomeric as well as rigid structural polymer component materials. The formed elastomeric components preferentially include; impact dissipation members, and a plurality of gaskets such as a top cover gasket, a motor gasket, and an actuator gasket. The formed rigid structural components and features preferentially include; rigid base deck side walls, alignment guides formed in the rigid base deck side walls, filter retention fingers adjacent the rigid base deck side walls and a ramp load/unload formed on an internal surface of the rigid base deck side walls.

These and various other features and advantages that characterize the claimed invention will be apparent upon reading the following detailed description and upon review of the associated drawings.

BRIEF DESCRIPTION OF THE DRAWINGS

FIG. 2 is a top perspective view of a platform portion of the base deck of FIG. 1.

FIG. 3 is a top perspective view of an over-mold portion of the base deck of FIG. 1.

FIG. 4 is a top perspective view of the base deck of FIG. 1.

FIG. 6 is a top perspective exploded view of the base deck of FIG. 1.

DETAILED DESCRIPTION

Figure 1:
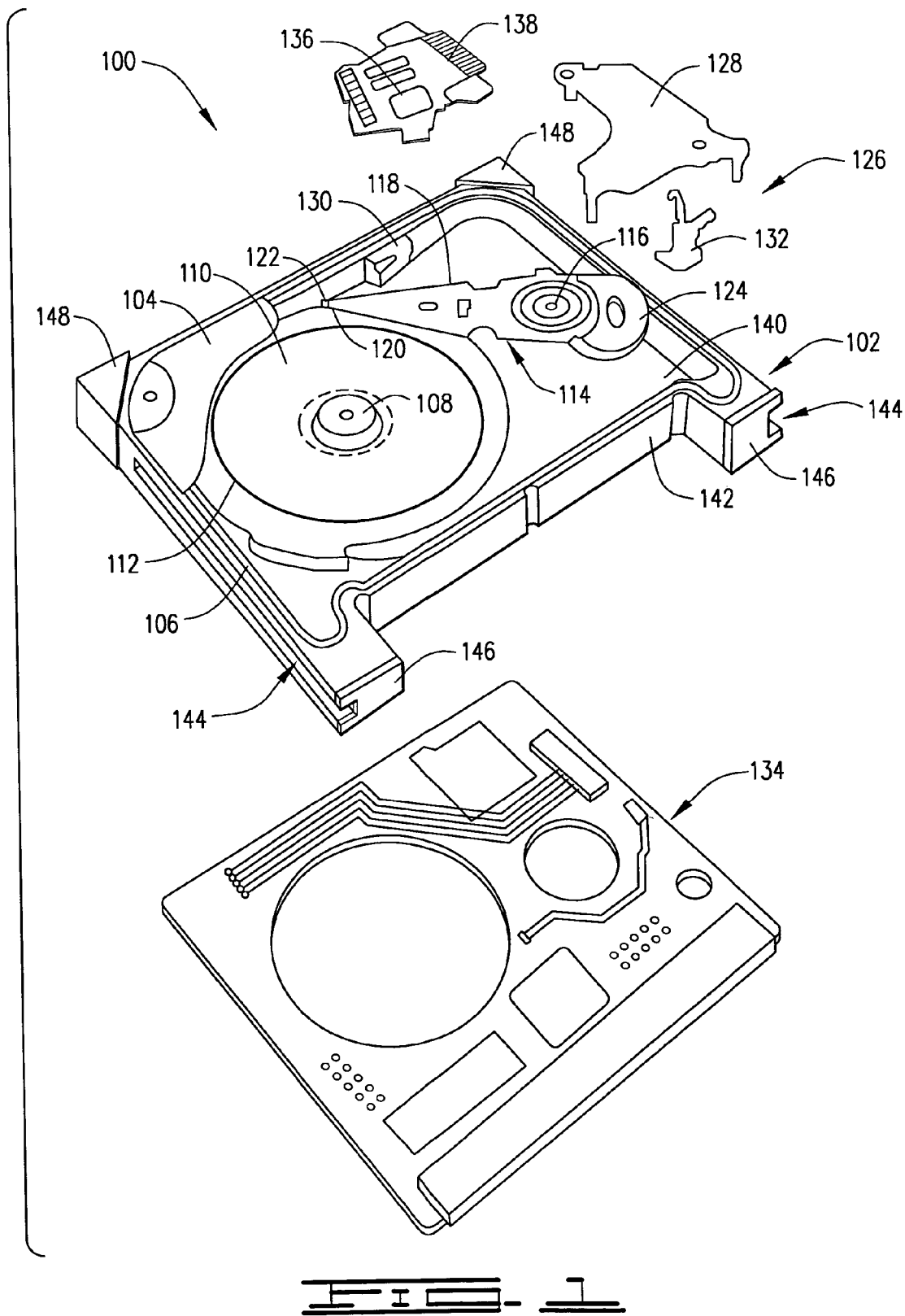
FIG. 1 is a partial cut-away, exploded top perspective view of a data storage device (DSD) that incorporates a base deck with a plurality of over-molded elastomeric and structurally rigid components of the present invention.

A data storage device (DSD) 100 constructed in accordance with a preferred embodiment of the present invention is shown in FIG. 1. The DSD 100 includes a base deck 102 to which various components of the DSD 100 are mounted. A top cover 104 shown partially cut-away, cooperates with the base deck 102 to compress an elastomeric sealing component (top cover gasket 106) to form an internal, sealed environment, for the components of the DSD 100 described herein below.

Enclosed within the DSD 100, as shown in FIG. 1, is a spindle motor assembly (motor) 108, which rotates one or more information storage discs (disc) 110 at a constant high speed. Information is written to and read from information tracks (tracks) 112 on the discs 110, through the use of an actuator assembly (actuator) 114, which rotates about a bearing shaft assembly 116 positioned adjacent the discs 110. The actuator 114 includes at least one actuator arm (arm) 118, which rotates over the surfaces of the discs 110, with one or more flexures 120 extending from the arm 118. Mounted at the distal end of each of the flexures 120 is a head 122, which includes an air bearing slider enabling the head 122 to fly in close proximity above the corresponding surface of the associated disc 110.

During operation of the DSD 100, the motor 108 rotates the discs 110 at a substantially constant operational speed. The actuator 114 supports and rotates the heads 122 into a data exchange relationship adjacent the tracks 112 to write data to and read data from the discs 110 when current is applied to a coil 124 of a voice coil motor (VCM) 126. The coil 124 cooperates with a pole piece 128 to produce the rotary motion provided by the VCM 126. When the DSD 100 is deactivated, the actuator 114 positions the heads 122 adjacent a ramp load/unload 130 and the actuator 114 is confined by latching a toggle latch 132. However, alternative means for restraining the actuator 112 may be employed, for example, a ramp load/unload mechanism (not shown) may be incorporated to constrain movement of the actuator 112 during periods of inactivity of the DSD 100.

The flexure 120 provides a predetermined spring force on the head 122 to maintain the proper data exchange relationship between the head 122, and the disc 110 during operation of the DSD 100. Additionally, the flexure 120 serves to connect the head 122 with the arm 118 of the actuator 114.

Command, control, and interface electronics for the DSD 100 are provided on a printed circuit board assembly (PCBA) 134 mounted to the base deck 102. During data transfer operations, a preamplifier/driver (preamp) 136 attached to a flex circuit 138, conditions read/write signals conducted by the flex circuit 138 between the PCBA 134 and the heads 122.

The base deck 102 has a platform portion 140 that is generally of rectangular shape, and is preferably formed from metal, or other like material by a method such as stamping, or fine blanking. The platform portion 140 generally acts as a structural foundation for the over-molded rigid structural, and elastomeric components such as the ramp load/unload 130, rigid base deck side walls (side walls) 142, interface alignment guides 144, the top cover gasket 106, and impact dissipation members 146 and 148. The alignment guides 144 align the DSD 100 for proper engagement with a device, such as a printer, digital camera, computer, or device control electronics served by the DSD 100.

The platform portion 140 of the base deck 102 of the preferred embodiment of the present invention is shown in FIG. 2. A motor mount aperture 150 for mounting the motor 108 (of FIG. 1) is defined within a first centrally located depression 152, and an actuator mount aperture 154 for mounting the actuator 114 (of FIG. 1) is defined in a second peripheral located depression 156 of the platform portion 140.

A disc relief region 158 is formed in the platform portion 140, adjacent the first centrally located depression 152, which accommodates rotation of the disc 110 (of FIG. 1) during operation of the DSD 100 (of FIG. 1). A voice coil relief region 160, adjacent the second peripheral located depression 156, is provided to accommodate rotation of the actuator 114 during operation of the DSD 100.

Additionally, among other features provided by the platform portion 140, a recirculation filter reception region 162 is provided in a preferred corner of the platform portion 140. However, because of the limitations inherent in stamping and fine blanking processes (the preferred mode of producing the platform portion 140), not all features of the base deck 102 can be accommodated by a stamped, or fine blanked platform portion 140.

Indicated by a dashed line in FIG. 2, is an over-mold host region 163, provided around the periphery of the platform portion 140. The over-mold host region 163 is encapsulated by an over-mold portion 164 (of FIG. 3). The over-mold portion 164 provides features of the base deck 102 that are difficult to attain by either a stamping, or fine blanking production process.

FIG. 3 shows the over-mold portion 164 of the base deck 102. Preferably, the rigid features resulting from the over-mold process include: the ramp load/unload 130, the side walls 142, and filter retention fingers 166. The alignment guides 144 are examples of features of the base deck 102 that are difficult to attain while fine blanking, or stamping the platform portion 140 of the base deck 102.

Preferably, to eliminate machining operations, the side walls 142 of the base deck 102 act as mounting features between the platform portion 140 of the base deck 102 and top cover 104 (of FIG. 1), while the alignment guides 144 molded into the side walls 142 act as mounting features between the DSD 100 (of FIG. 1) and the device served by the DSD 100.

A first and a second type of polymer are used during the base deck 102 over-mold formation process. One preferred polymer for the first type of polymer is a thermo-set plastic used for forming rigid structural components.

FIG. 4 shows several additional elastomeric components that have been concurrently over-molded onto the side walls 142 and the platform portion 140. That is to say, both the rigid structural components and the elastomeric components are molded during a common process. These additional elastomeric components include; a motor gasket 168, and an actuator gasket 170. Collectively, the top cover gasket 106, the motor gasket 168, the actuator gasket 170, the motor 108 (of FIG. 1), and the actuator 114 (of FIG. 1) combined with the top cover 104 (of FIG. 1) are among the components active in forming the sealed environment for the disc 110 (of FIG. 1) and the head 122 (of FIG. 1).

The impact dissipation members 146 and 148, aid in dissipating impact forces encountered by the DSD 100 (of FIG. 1) during the manufacturing process of the DSD 100, as well as during the operational life of the DSD 100. In a preferred embodiment, the elastomeric components are formed from an epoxidized elastomer, such as 3M 7001 produced by the 3M Company of St. Paul, Minn., which cures, or cross-links at an elevated temperature in the range of 150° C. for a period of substantially 2 hours.

FIG. 4 also shows that the side walls 142 include an internal surface 172, an external surface 174, and a top surface 176. The alignment guides 144 are formed within a portion of the side walls 142, and are enclosed by the external surfaces of that portion of the side walls 142. The ramp load/unload 130 is formed adjacent the internal surface 172, and the top cover gasket 106 is supported by the top surface 176.

Over-molding rigid structural components to the platform portion 140, is preferably accomplished by utilizing a polymer over-molding process such as polymer insert molding, although other over-molding processes are understood to be within the scope of the present invention. Polymer insert molding provides a consistent mechanism accurately positioning the structural components on the platform portion of the base deck 102.

Rigid structural components that can be over-molded to the platform portion 140 of the base deck 102 generally include; any plastic component, part or feature of a DSD 100 that is secured either directly to the platform portion 140, or indirectly through another over-molded structural component to the platform portion 140. Thus, it should be understood that the over-molded rigid structural components shown in FIGS. 3 and 4 are exemplary for illustrative purposes only, and that other over-molded components capable of being fastened to the platform portion 140 are within the scope of the present invention. Additionally, the examples of elastomeric components presented in FIGS. 3 and 4 are for illustrative purposes, and do not service as limitations on the present invention.

Over-molding components to the platform portion 140 of the base deck 102 provides several advantages over either a die-cast, or extruded base deck 102. These advantages include the elimination of fasteners and manufacturing stations required to install discrete pre-fabricated components to the die-cast, or extruded base deck, thereby reducing manufacturing costs and potential handling damage to the DSD 100. The elimination of discrete pre-fabricated components reduces both direct and indirect manufacturing cost, because the components displaced by the over-molding process no longer need to be purchased and carried in inventory. The reduction of tight tolerances of the platform portion 140 reduces the manufacturing costs of the platform portion 140 by allowing alternate manufacturing techniques such as stamping to be utilized. The elimination of mounting rails as a integral portion of the die-cast/extruded platform portion 140 of the base deck 102 simplifies the platform portion 140, which reduces both the material and processing costs for the platform portion 140. The elimination of the need for much of the manufacturing space required for the assembly of the components onto the die-cast, or extruded base deck, reduces the overhead component of the manufacturing cost by providing additional manufacturing capacity. Finally, the elimination of post machining operations required for the use of die-cast, or extruded base decks cuts material, processing, scrap and overhead costs out of the over cost of producing the DSD 100.

Figure 5:
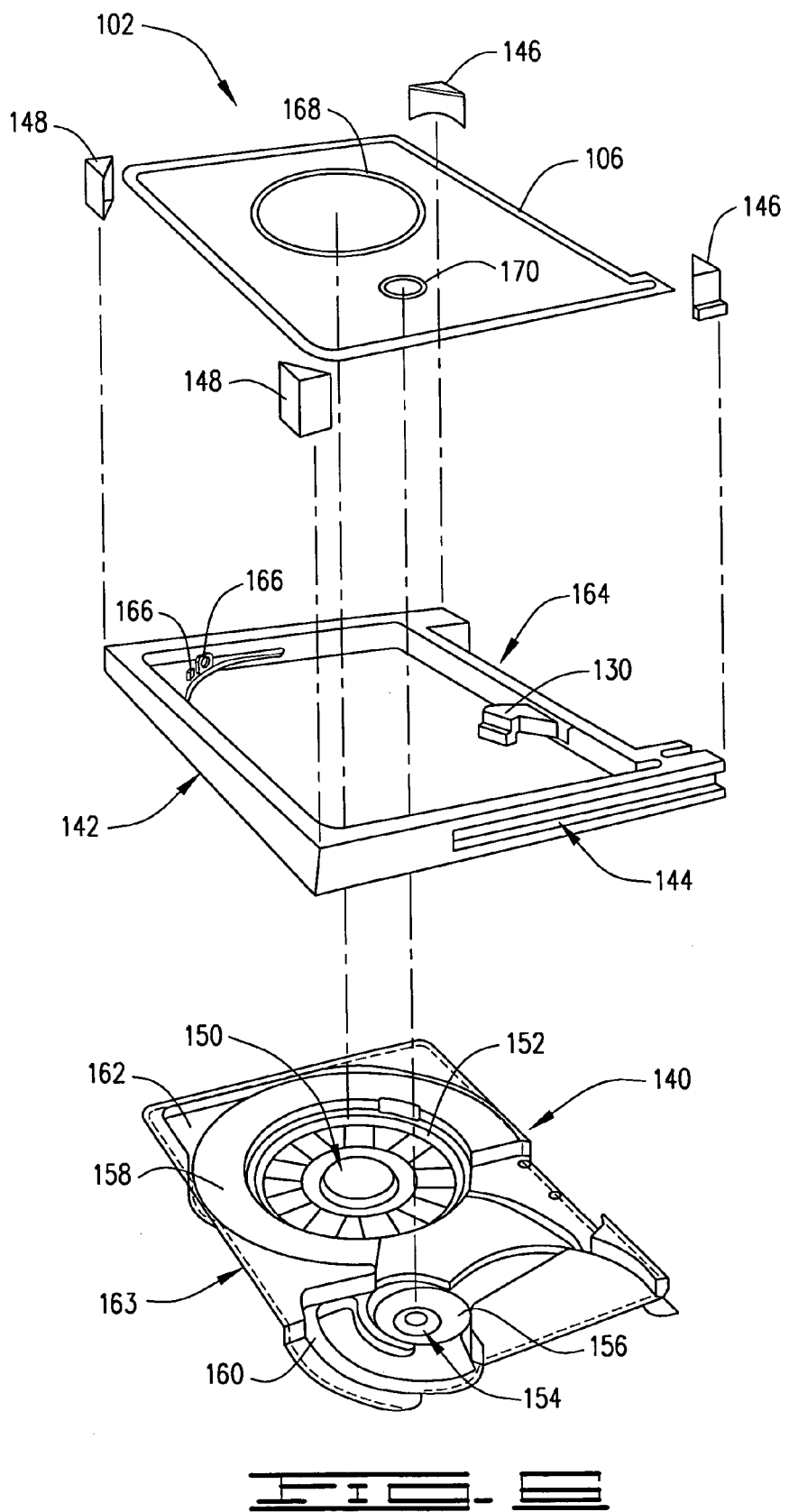
FIG. 5 is a flow diagram showing steps for forming the base deck of FIG. 1.

FIG. 5 shows a method 200, for manufacturing a base deck (such as 102) in accordance with a preferred embodiment of the present invention, by over-molding components onto a platform portion (such as 140) of the base deck. The method 200, commences at start step 202, and continues to process step 204. At process step 204, the platform portion of the base deck is preferably formed through application of a metal working process such as stamping, or fine blanking. At process step 206, the platform portion thus formed is placed in a mold cavity having recesses for one, or more over-molded structural components on the platform portion.

At process step 208, the mold is closed and a first polymer (preferably a thermo-set plastic) is injected into the recesses. At process step 210, over-molded rigid structural components (such as side walls 142; ramp load/unload 130; and filter retention fingers 166) are formed on the platform portion. At process step 212, gates within the mold are opened to expose additional recesses for inclusion of a second polymer (preferably an epoxidized elastomer) for use in forming elastomeric components (such as top cover gasket 106; motor gasket 168; actuator gasket 170; and impact dissipation members 146, 148). At process step 214, the second polymer is introduced into the additional recesses. At process step 216, the elastomeric components are formed on both the platform portion, as well as on the rigid structural components.

At process step 218, the platform portion with molded in-place components is removed from the mold. At process step 220, the platform portion with molded in-place components is placed in a cure oven to complete the cross-linking of the elastomeric material. At process step 222, the formed base deck is removed from the cure oven, and the process for manufacturing the base deck concludes at end process step 224.

FIG. 6 is an exploded view of FIG. 4 and is provided to further enhance the understanding of the present invention. The sign numbers associated with features and elements of FIG. 6 have been discussed hereinabove and shall not be repeated here.

It will be clear that the present invention is well adapted to attain the ends and advantages mentioned as well as those inherent therein. It will be understood that although the preferred embodiment described herein is directed to a base deck having over-molded elastomeric, and rigid structural components for a data storage device, it will be appreciated by those skilled in the art that the teachings of the present invention can be applied to other systems without departing from the scope and spirit of the present invention.

It is also to be understood that even though numerous characteristics and advantages of various embodiments of the present invention have not been set forth in the foregoing description, together with details of the structure, and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, other over-molded structural components not disclosed in the detailed specification are, also envisioned to be within the scope of the present invention, and may include (but are not limited to); locating features, sound attenuation devices, and flexible circuit routing structures.

What is claimed is:

1. A base deck comprising a platform portion supporting an over-mold portion, the over-mold portion comprising a rigid structural component comprising a first polymer and a plurality of concurrently formed elastomeric components each comprising a distinct second polymer, wherein a first elastomeric component of said plurality contactingly engages the platform portion and a second elastomeric component of said plurality contactingly engages the rigid structural component apart from the platform portion.

2. The base deck of claim 1, in which the platform portion includes an over-mold host region, wherein the over-mold portion encases the over-mold host region to encapsulate the over-mold host region.

3. The base deck of claim 1, in which the platform portion comprises:

a first centrally located depression enclosing a motor mount aperture, the motor mount aperture for mounting a motor;

a second peripheral located depression adjacent the first centrally located depression confining an actuator mount aperture, the actuator mount aperture for mounting an actuator, a disc relief region adjacent the first centrally located depression, the disc relief region accommodates rotation of a disc;

a voice coil relief region adjacent the second peripheral located depression, the voice coil relief region accommodates rotation of an actuator; and a recirculation filter reception region adjacent the first centrally located depression.

4. The base deck of claim 3, in which the over-mold portion comprises:

a rigid base deck side wall with an external surface, an internal surface and a top surface, the rigid base deck side wall over-molded on the platform portion;

an alignment guide formed in the rigid base deck side wall, the alignment guide confined by the external surface;

a filter retention finger adjacent the internal surface and supported by a recirculation filter reception region of the platform portion; and a ramp load/unload formed on the internal surface of the rigid base deck side wall.

5. The base deck of claim 4, in which the over-mold portion further comprises:

a top cover gasket supported by the top surface;

a motor gasket supported by the first centrally located depression and adjacent the motor mount aperture;

an actuator gasket supported by the second peripheral located depression and adjacent the actuator mount aperture; and an impact dissipation member communicating with the top surface as well as the external surface of the rigid base deck side wall.

6. The base deck of claim 5, in which the impact dissipation member provides the alignment guide.

7. The base deck of claim 6, in which the impact dissipation member, the actuator gasket, the motor gasket and the top cover gasket are formed from an epoxidized elastomer.

8. The base deck of claim 6, in which the ramp load/unload, the filter retention finger and the rigid base deck side wall are formed from a thermo-set plastic.

9. The base deck of claim 1, in which the over-mold portion comprises:

a rigid back deck side wall with an external surface and an internal surface, the rigid base deck side wall over-molded on the platform portion;

an alignment guide formed in the rigid base deck side wall, the alignment guide confined by the external surface;

a filter retention finger adjacent the internal surface and supported by a recirculation filter reception region of the platform portion; and a ramp load/unload formed on the internal surface of the rigid base deck side wall.

10. The base deck of claim 9, in which the platform portion includes an over-mold host region, wherein the over-mold portion encases the over-mold host region to encapsulate the over-mold host region.

11. The base deck of claim 1, wherein the first elastomeric component contactingly engages the platform portion without contactingly engaging the rigid structural component.

12. The base deck of claim 1, wherein the platform comprises an annular aperture extending therethrough, and wherein the first elastomeric component is proximate to and surrounds the annular aperture.

13. The base deck of claim 12, wherein the first elastomeric component seals a rotatable member supported thereon.

14. The base deck of claim 1, wherein the rigid structural component is disposed between the platform portion and the second elastomeric component.

15. The base deck of claim 14, wherein the second elastomeric component is characterized as an impact dissipation member.

16. A base deck comprising a platform portion supporting an over-mold portion, the over-mold portion comprising a rigid structural component and a plurality of concurrently formed elastomeric components, the base deck formed by a process comprising a step of concurrently over-molding the platform portion with a first polymer to form the rigid structural component and a distinct second polymer to form the plurality of elastomeric components, wherein a first elastomeric component of said plurality contactingly engages the platform portion apart from the rigid structural component, and wherein a second elastomeric component of said plurality contactingly engages the rigid structural component apart from the platform portion.

17. The base deck of claim 16, in which the platform portion includes an over-mold host region, wherein the over-mold portion encases the over-mold host region to encapsulate the over-mold host region.

18. The base deck of claim 16, in which the platform portion is a metallic substrate formed by a fine blanking process, the first polymer is a thermo-set plastic, and the second polymer is an epoxidized elastomer.

* * * * *